US011048887B1

(12) United States Patent
Gupta et al.

(10) Patent No.: US 11,048,887 B1
(45) Date of Patent: Jun. 29, 2021

(54) CROSS-LANGUAGE MODELS BASED ON TRANSFER LEARNING

(71) Applicant: Intuit Inc., Mountain View, CA (US)

(72) Inventors: Sparsh Gupta, San Diego, CA (US); Igor Podgorny, San Diego, CA (US); Faraz Sharafi, San Diego, CA (US); Matthew Cannon, San Diego, CA (US); Vitor R. Carvalho, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 216 days.

(21) Appl. No.: 16/521,129

(22) Filed: Jul. 24, 2019

(51) Int. Cl.
*G06F 40/00* (2020.01)
*G06F 40/58* (2020.01)
*G06F 17/16* (2006.01)
*G06N 3/08* (2006.01)
*G06K 9/62* (2006.01)

(52) U.S. Cl.
CPC .............. *G06F 40/58* (2020.01); *G06F 17/16* (2013.01); *G06K 9/6267* (2013.01); *G06N 3/08* (2013.01)

(58) Field of Classification Search
CPC ........ G06N 20/00; G06N 3/0454; G06N 3/08; G06N 3/0472; G06N 3/088; G06F 40/30; G06F 40/216; G06F 40/44; G06F 40/58; G06F 40/279; G06F 40/263; G06F 40/226; G06F 16/24578; G06F 40/242; G06F 16/353; G10L 15/16; G10L 15/18;
(Continued)

(56) References Cited

U.S. PATENT DOCUMENTS

| 8,521,507 B2 * | 8/2013 | Shi ..................... G06F 16/35 704/2 |
| 10,067,913 B2 * | 9/2018 | Abdel-Hady ........... G06F 16/35 |

(Continued)

OTHER PUBLICATIONS

H. Palangi et al., "Deep Sentence Embedding Using Long Short-Term Memory Networks: Analysis and Application to Information Retrieval," in IEEE/ACM Transactions on Audio, Speech, and Language Processing, vol. 24, No. 4, pp. 694-707, Apr. 2016. (Year: 2016).*

(Continued)

*Primary Examiner* — Edgar X Guerra-Erazo
(74) *Attorney, Agent, or Firm* — Ferguson Braswell Fraser Kubasta PC

(57) ABSTRACT

A method for text classification involves generating, using a bilingual embedding model, source language embeddings for source language documents; obtaining source language document labels of the source language documents; and training a source language classifier model and a label embedding network, executing on a computing system, using the source language embeddings and the source language document labels. The method further involves generating pseudo-labels for unlabeled target language documents, by: generating, using the bilingual embedding model, target language embeddings for the unlabeled target language documents, and applying the source language classifier model and the label embedding network to the target language embeddings to obtain the pseudo-labels for the unlabeled target language documents. In addition, the method involves training a target language classifier model executing on the computing system using the target language embeddings and the pseudo labels.

20 Claims, 9 Drawing Sheets

(58) Field of Classification Search
CPC ..... G10L 15/183; G10L 17/18; G10L 15/063; G10L 15/075
See application file for complete search history.

(56) References Cited

U.S. PATENT DOCUMENTS

| | | | | |
|---|---|---|---|---|
| 10,282,420 | B2* | 5/2019 | Jiang | G06F 40/30 |
| 10,417,350 | B1* | 9/2019 | Mohamed | G06F 40/58 |
| 10,628,527 | B2* | 4/2020 | Williams | G06N 5/022 |
| 10,803,257 | B2* | 10/2020 | Joo | G06N 3/0445 |
| 2012/0197627 | A1* | 8/2012 | Shi | G06F 16/35 |
| | | | | 704/2 |
| 2014/0337005 | A1* | 11/2014 | Abdel-Hady | G06F 16/35 |
| | | | | 704/2 |
| 2018/0047036 | A1* | 2/2018 | Zhang | G06N 5/022 |
| 2018/0341863 | A1* | 11/2018 | Ding | G06F 16/2237 |
| 2019/0251164 | A1* | 8/2019 | Ding | G06F 16/353 |
| 2019/0294684 | A1* | 9/2019 | Joo | G06F 40/44 |

OTHER PUBLICATIONS

Ruder, Sebastian et al., "A Survey of Cross-lingual Word Embedding Models"; Cornell University: <https://arxiv.org/abs/1706.04902v3>; Version v3 submitted May 30, 2019 (61 pages).

* cited by examiner

CROSS-LANGUAGE MODELS BASED ON TRANSFER LEARNING

BACKGROUND

The utility of software applications is frequently not limited by the language that potential users speak. For example, a software that is available to North American users in English may be equally beneficial to users speaking French if interactions with the software were possible in French. Accordingly, it may be desirable to enable interactions with software applications in multiple languages. However, a software application may initially be designed for interactions with users in one language. For example, many software applications support English language interactions but may not support the same interactions in other languages. Such interactions may be, for example, the processing of user-submitted search queries or the routing of user-submitted questions to services capable of answering these questions. These interactions frequently involve a classification task performed by a classifier system. While the classifier system may be well-trained to process input submitted in a source language due to an abundance of training data for the source language, less training data may be available to train a classifier system to process input submitted in another language. Accordingly, training the classifier system to operate on input in the other language may be challenging.

SUMMARY

In general, in one aspect, one or more embodiments of the disclosure relate to a method for text classification. The method includes generating, using a bilingual embedding model, a plurality of source language embeddings for source language documents; obtaining a plurality of source language document labels of the source language documents; training a source language classifier model and a label embedding network, executing on a computing system, using the plurality of source language embeddings and the plurality of source language document labels; generating a plurality of pseudo-labels for a plurality of unlabeled target language documents, by: generating, using the bilingual embedding model, a first plurality of target language embeddings for the plurality of unlabeled target language documents, and applying the source language classifier model and the label embedding network to the first plurality of target language embeddings to obtain the plurality of pseudo-labels for the unlabeled target language documents; and training a target language classifier model executing on the computing system using the plurality of target language embeddings and the plurality of pseudo labels.

In general, in one aspect, one or more embodiments of the disclosure relate to a system for text classification, the system comprising: a computer processor; and a classifier training configuration executing on the computer processor, and configured to: generate, using a bilingual embedding model, a plurality of source language embeddings for source language documents; obtain a plurality of source language document labels of the source language documents; train a source language classifier model and a label embedding network, executing on a computing system, using the plurality of source language embeddings and the plurality of source language document labels; generate a plurality of pseudo-labels for a plurality of unlabeled target language documents, by: generating, using the bilingual embedding model, a first plurality of target language embeddings for the plurality of unlabeled target language documents, and applying the source language classifier model and the label embedding network to the first plurality of target language embeddings to obtain the plurality of pseudo-labels for the unlabeled target language documents; and train a target language classifier model executing on the computing system using the plurality of target language embeddings and the plurality of pseudo labels.

In general, in one aspect, one or more embodiments of the disclosure relate to a non-transitory computer readable medium including computer readable program code for causing a computer system to: generate, using a bilingual embedding model, a plurality of source language embeddings for source language documents; obtain a plurality of source language document labels of the source language documents; train a source language classifier model and a label embedding network, executing on a computing system, using the plurality of source language embeddings and the plurality of source language document labels; generate a plurality of pseudo-labels for a plurality of unlabeled target language documents, by: generating, using the bilingual embedding model, a first plurality of target language embeddings for the plurality of unlabeled target language documents, and applying the source language classifier model and the label embedding network to the first plurality of target language embeddings to obtain the plurality of pseudo-labels for the unlabeled target language documents; and train a target language classifier model executing on the computing system using the plurality of target language embeddings and the plurality of pseudo labels.

Other aspects of the disclosure will be apparent from the following description and the appended claims.

DETAILED DESCRIPTION

Figure 1:
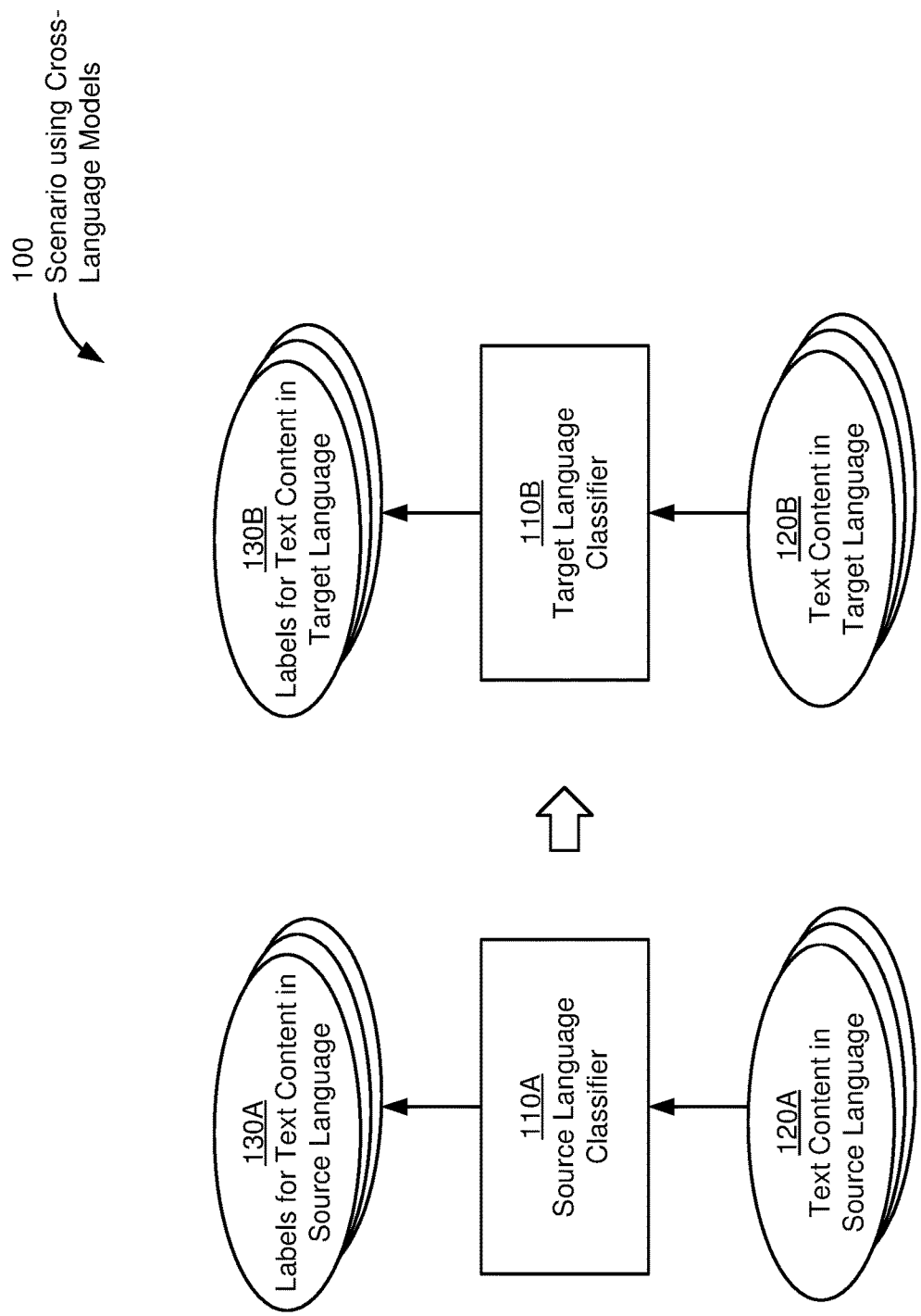
FIG. 1 shows a scenario using cross language models, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide methods and systems for training a classifier system to perform a classification task in a target language, in accordance with one or more embodiments. A classification task is a computer implemented task of determining a class of a document based, at least in part, on the content of the document. A source language may have a large number of labeled documents to train a classifier system, whereas a target language only has a limited number of documents. The source language and the target language are natural languages (i.e., human languages), such as English, German, Turkish, Romanian, Hindi, Mandarin, etc.

Methods of transfer learning may be used to train the classifier system to perform the classification task in the target language, based on similar classification tasks being performed in the source language, after initially training the classifier system in the source language. A significant portion of the training of the classifier system is performed in the source language, in accordance with one or more embodiments of the disclosure. In the source language, the training may be particularly feasible because an abundance of training samples is typically available, thus proving a rich set of training samples which may be used in a supervised learning approach. Significantly less training samples may be available in the target langue, thus preventing a training of the target language classifier directly in the target language.

In the subsequently described transfer learning-based approach, a source language classifier that has been trained in the source language is used to generate training samples in the target language, in accordance with one or more embodiments of the disclosure. The transfer-learning-based approach, thus, enables the training of a target language classifier despite a shortage of training samples in the target language. More specifically, initially, a source language classifier is trained using the abundantly available training samples in the source language. The resulting source language classifier may already have a limited capability of performing classifications in the target language. In one or more embodiments, this is possible because documents in the source language and documents in the target language are represented in joint embedding space that accommodates the source language and the target language. The accuracy of the resulting source language classifier for classifications in the target language, after the initial training in the source language, may be augmented by an additional training using the limited number of available training samples in the target language. The resulting improved source language classifier may subsequently be used to generate an extensive set of target language training data by feeding unlabeled target language documents through the source language classifier, thereby predicting a label for each of the unlabeled target language documents. The combination of the initially unlabeled target language documents and the predicted labels may then be used to train a separate target language classifier that is capable of classifying target language documents without relying on the source language classifier. The described training may be performed using methods of supervised learning, in accordance with one or more embodiments.

Turning to FIG. 1, a scenario using cross language models, in accordance with one or more embodiments of the disclosure, is shown. The scenario includes a source language classifier (110A) and target language classifier (110B). The source language classifier (100A) operates on text content in a source language (120A) to classify the text content by predicting labels for the text content in the source language (130A). The target language classifier (110B) operates on text content in a target language (120B) to classify the text content by predicting labels for the text content in the target language (130B). The text content in the source/target language (120A,120B) may be any kind of text to be classified. The text content in the source/target language (120A,120B) may be visual or audio text. The text content in the source/target language (120A,120B) may be of any length. For example, the text content in the source/target language (120A,120B) may be a phrase forming a statement or a request, or a long multi-page document. The text content, regardless of length, is referred to as a document.

The source language classifier/target language classifier (110A, 110B), in accordance with one or more embodiments of the disclosure, is a binary or multiclass classifier which has been trained using machine learning methods, as discussed in detail below with reference to FIGS. 2, 3, 4, 5, 6, and 7. The training of the target language classifier (110B) is performed using methods of transfer learning, based on the previously trained source language classifier (110A). After the training, the target language classifier (110B) may perform the classification of the text content in the target language (120B) as described below with reference to FIG. 8.

The labels for the text content in the source language/target language (130A, 130B), in accordance with one or more embodiments, indicate the classes to which the text content in the source/target language (120A, 120B) belong, based on the classification performed by the source/target language classifier (110A, 110B).

In one or more embodiments of the disclosure, an abundance of training samples consisting of pairs of a text content (e.g. a single document) and a corresponding label are available to enable supervised learning to train the source language classifier (110A). In contrast, fewer training samples may be available in the target language. An insufficient number of training samples may be available in the target language, thereby preventing a direct supervised learning approach to be applied for training the target language classifier (110B). Instead, in one or more embodiments of the disclosure, a transfer learning approach is used to derive the target language classifier (110B) from the source language classifier (110A). The methods and systems for training the target language classifier (110B) using the previously trained source language classifier (110A) are subsequently described. While FIG. 1 shows a scenario in which a single target language classifier (110B) is obtained, additional target language classifiers may be obtained in a similar manner. For example, the source language classifier may be based on English language text content. One target language classifier may be derived for French language text content, another target language classifier may be derived for Spanish language text content, etc.

Figure 2:
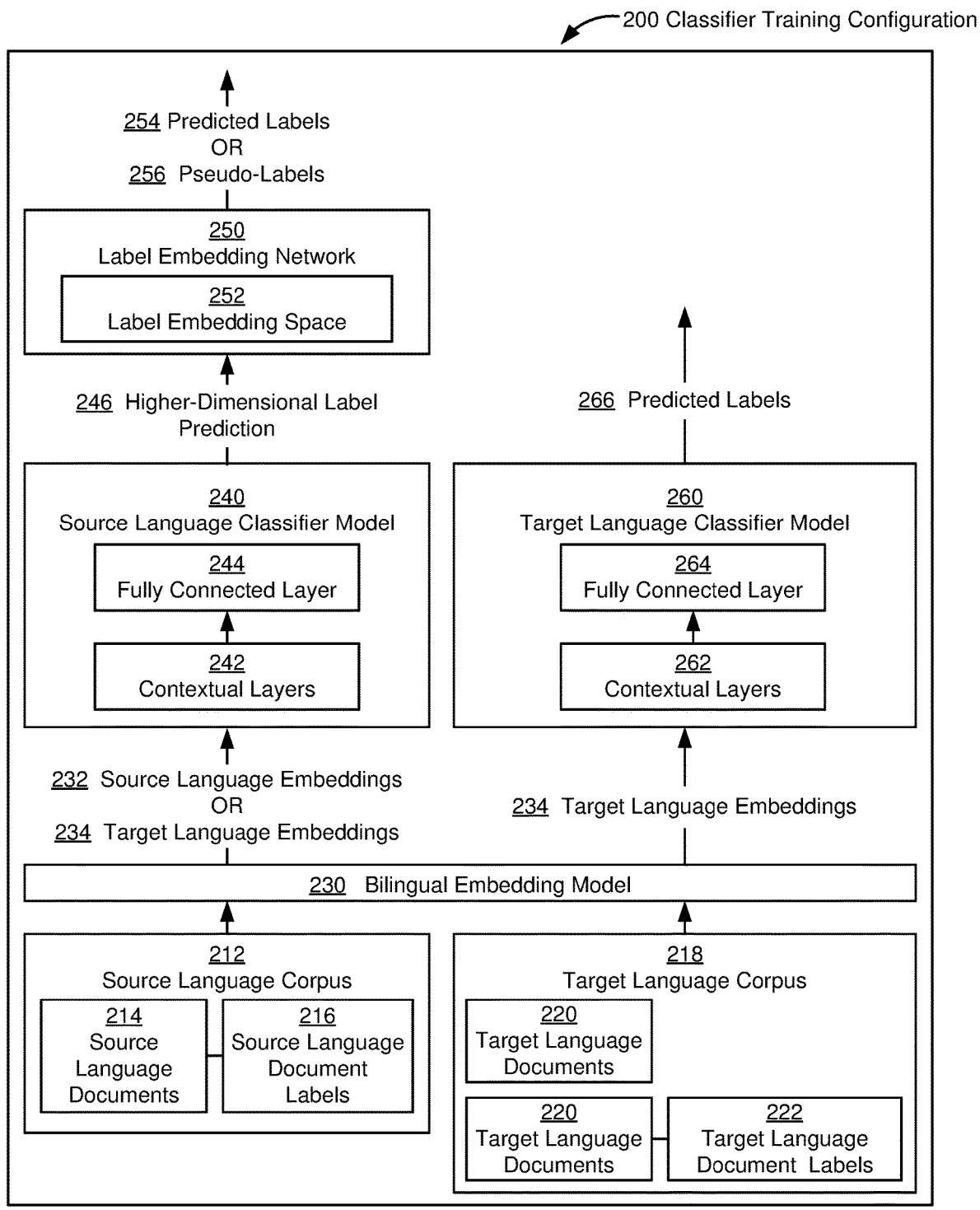
FIG. 2 shows a classifier training configuration, in accordance with one or more embodiments of the disclosure.

Turning to FIG. 2, a classifier training configuration (200), in accordance with one or more embodiments of the disclosure, is shown. The classifier training configuration (200) is a system configured to train the target language classifier (110B) of FIG. 1 after initially training the source language classifier (110A) of FIG. 1. The classifier training configuration (200) may be executed on a computing system such as the computing system of FIGS. 9A and 9B.

The source language corpus (212), in one or more embodiments of the disclosure, is a supervised corpus of training data. The source language corpus (212) includes source language documents (214) with corresponding source language document labels (216). The supervised corpus is for the training of the source language classifier model (240) along with the label embedding network (250). The source language corpus (212) may include many source language documents (214), e.g., thousands or millions of text documents. Each of these text documents may be assigned to a class, based on certain characteristics of the text document. The source language document label (216) identifies the assigned class of the corresponding source language document (214).

For example, if a classification is to be performed between positive and negative sentiment of the source language documents (214), each of these text documents may be accompanied by a source language document label (216) indicating either "positive" or "negative". Source language documents for which a sentiment is obtained may be, for example, user reviews. In another example, in which a classification is performed between income brackets of users, each of the source language documents may be accompanied by a source language document label indicating, for example, "<$20,000", "$20,000 . . . $70,000", and ">$70,000". Source language documents for which an income classification is obtained may be, for example, financial documents of users. The source language documents (214) may have any format, including visual and audio language. The source language documents may further have any length and may range from a phrase to multi-page documents. The source language document labels (216) may have any format including binary "1/0", "yes/no", "positive/negative" format for binary classifications, and numerical or alphanumerical format for multiclass classifications. A categorical format such as "W-2", "deductions, "print return" may be used, for example, in case of an English language tax software application.

The target language corpus (218), in one or more embodiments of the disclosure, is a semi-supervised or unsupervised corpus of training data. The target language corpus (218) includes target language documents (220) for the training of the target language classifier model (260). The target language corpus (218) may include target language document labels (222) for at least some of the target language documents (semi-supervised corpus) or may not include any target language document labels (222) (unsupervised corpus). Accordingly, the target language corpus (218) may include unlabeled and labeled target language documents (220). In one or more embodiments, a small percentage of the target language documents (220) is labeled. The target language corpus (218) may include many target language documents (220), e.g., thousands or millions of text documents. In one or more embodiments, the type of content of at least some of the target language documents (220) may be the same type of content of at least some of the source language documents (214). For example, if the source language documents (214) contain feedback on a product in the source language, then the target language documents (220) may contain feedback on the same product in the target language.

Generally, the target language documents (220) may have characteristics similar to the source language documents (214), except for the target language documents (220) being in the target language and the source language documents (214) being in the source language. Further, similar to the source language documents (214), the target language documents (220) may be assigned to a class, when performing a classification. However, frequently no target language document labels may be available to indicate the classification of the target language documents (220).

In one or more embodiments of the disclosure, the source language corpus (212) and the target language corpus (218) may be stored in one or more data repositories (not shown). The date repositories may be any type of storage unit and/or device (e.g., a file system, database, collection of tables, or any other storage mechanism) for storing data. Further, the data repositories may include multiple different storage units and/or devices. The multiple different storage units and/or devices may or may not be of the same type or located at the same physical site.

The bilingual embedding model (230), in accordance with one or more embodiments of the disclosure, contains high-dimensional vector representations for words in the source language and in the target language. The vector representing a word may include tens, hundreds, thousands or more elements. Equivalent words in the source language and the target language may be mapped to similar points in the high-dimensional joint embedding space, based on the elements of the vector. In contrast, non-equivalent words in the source language and the target language may be mapped to non-similar points in the high-dimensional joint embedding space. The similarity may allow for limited offsets between individual elements of the vector, a scaling difference of the vector, etc. The degree of similarity in the high-dimensional joint embedding space may depend on various factors including, but not limited to, the training samples in the source and target languages used for initially training the bilingual embedding model (230), the type of training having been performed, etc.

In one example, the bilingual embedding model (230) would represent the French word "chat" using a French language embedding, and the English word "cat" using an English language embedding. The English language embedding and the French language embedding are likely to be similar points in the high-dimensional vector space of the bilingual embedding model (230). The bilingual embedding model (230) may be used for training the source language classifier model and the target language classifier model, as discussed below.

To establish the high-dimensional vector space for words in the source and target languages, the bilingual embedding model may be trained using corpora (not shown) provided in the source and target languages. The corpora for training the bilingual embedding model (230) may include text documents that may or may not be specific to a particular domain (e.g., task domain, knowledge domain, technological domain). For example, the corpora may be specific to an engineering discipline, if the bilingual embedding model is intended to be used for an application that involves this engineering discipline. A corpus in one language may be available, and the corpus in the other language may be generated, by human or machine translation. Because the corpora are translations of each other, the high dimensional representation of words by the bilingual embedding model is likely to represent the same word in the source and target languages using similar points in the high-dimensional space.

The source language embeddings (232), in accordance with one or more embodiments of the disclosure, are high-dimensional vector representations of words obtained from the source language documents (214) using the bilingual embedding model (232). Accordingly, a source language document (214) may be represented by a set of source language embeddings (232). Separate sets of source language embeddings (232) may be prepared for separate source language documents (214).

The target language embeddings (234), in accordance with one or more embodiments of the disclosure, are high-dimensional vector representations of words obtained from the target language documents (220) using the bilingual embedding model (232). Accordingly, a target language document (220) may be represented by a set of target language embeddings (234). Separate sets of target language embeddings (234) may be prepared for separate target language documents (220).

The source language classifier model (240), in accordance with one or more embodiments of the disclosure, is an artificial neural network that classifies source language documents (214) based on the source language embeddings (232), provided as an input to the source language classifier model (240). The output of the source language classifier model (240) is a higher-dimensional label prediction (246) representing the classification of a source language document (214). The dimensionality of the higher-dimensional prediction (246) may depend on the task at hand. More specifically, the dimensionality may depend on the complexity of the task at hand. For example, the dimensionality for a simpler task (such as a sentiment classification) may be lower, whereas the dimensionality for a more complex task (such as a question answer ranking) may be higher. The complexity of semantic relationships (i.e., the associations between words, phrases, sentences, etc.), in particular, may affect the dimensionality. The dimensionality may, thus, be a tunable hyperparameter. The hyperparameter may be manually tuned, for example, using a hit-and-trial approach. Alternatively, the hyperparameter may be systematically tuned, for example, using a grid search that allows exploration of different values for the dimensionality until an optimal or sufficiently optimal value is found.

The classification of the source language document (214) by the source language classifier model (240) is based on the associated source language embeddings (232) and is in a higher-dimensional space. The source language classifier model (240) may further operate on the target language embeddings (234) to generate the higher-dimensional label prediction (246) representing the classification of a target language document (220) based on the associated target language embeddings (234), in the high-dimensional space.

The representation of a source language document (214) and a corresponding target language document (220) by a higher-dimensional label prediction (246) may be similar due to the use of the bilingual embedding model (230) for obtaining the source language embeddings (232) and target language embeddings (234). Specifically, the higher-dimensional label prediction (246) implicitly carries a classification of the underlying text document regardless of whether the text document is provided in the source language or in the target language. Thus, the higher-dimensional label prediction (246) allows for the formation of a label embedding space (252) that accurately represents source language documents (214) and target language documents (220) even though the training of the source language classifier model (240) is performed exclusively based on source language embeddings (232), as further discussed below.

The source language classifier model (240) in combination with the label embedding network (250) may form a binary classifier (performing yes/no, true/false, good/bad, etc. classifications) or a multi-class classifier for any number of classes. In one or more embodiments, the source language classifier model (240) is a deep learning model and includes contextual layers (242) and a fully connected layer (244). The contextual layer may be a recurrent neural network (RNN). The RNN may accept, as an input, a sequence of source language embeddings (232) or target language embeddings (234) to produce a sequence of vectors representing hidden layer outputs. These hidden layer output vectors may subsequently be processed by the fully connected layer (244) which may implement, for example, a softmax function producing the higher-dimensional label prediction (246). The fully connected layer may (244) may further be augmented with convolutional layers. The RNN may be a long short term memory (LSTM) recurrent neural network. In one or more embodiments of the disclosure, a bidirectional LSTM (Bi-LSTM) is used.

The classification behavior of the source language classifier model (240) may depend on the training performed prior to the application of the source language classifier model (240), discussed below with reference to FIGS. 4 and 5. In one or more embodiments, the training of the source language classifier model (240) is a prerequisite for training the target language classifier model (260).

The label embedding network (250), in accordance with one or more embodiments of the disclosure, establishes the label embedding space (252) based on the higher-dimensional label prediction (246). The label embedding space (252) is higher-dimensional, like the higher-dimensional label prediction (246). The label embedding space (252) may establish a common vector space in which classifications of source language documents (214) and target language documents (220) are similarly represented, allowing classifications of both source language documents (214) and target language documents (220) to be performed. In contrast, a hypothetical implementation using a source language classifier model (240) without the label embedding network (250), while being able to perform classifications of source language documents (214), would not perform particularly well when classifying target language documents (220), due to the lacking label embedding space (252).

The label embedding space (252) may be implemented by an artificial neural network accepting the higher-dimensional label prediction (246) as an input, and producing the label embedding space (252) when operating on the higher-dimensional label prediction (246). Various types of artificial neural network architectures with a varying number of layers and/or neurons may be used without departing from the disclosure. Simple tasks may be performed by smaller, simpler networks, whereas complex tasks may benefit from more sophisticated architectures. An additional neural network of one or more layers may operate on the output side of the label embedding network (250) to produce a classification. The classification may be obtained using a fully connected layer which may implement, for example, a softmax function to obtain class probabilities. The classification may be a predicted label (254) when operating on a source language document (214), or a pseudo-label (256) when operating on a target language document (220). In one or more embodiments, the predicted pseudo-labels (248) are used in an intermediate step to train the target language classifier model (260), as discussed below with reference to the flowcharts of FIGS. 4-7.

The target language classifier model (260), in accordance with one or more embodiments of the disclosure, is an artificial neural network that classifies target language documents (220) based on the target language embeddings (234), provided as an input to the target language classifier model (260). The output of the target language classifier model (260) includes predicted labels (266) indicating the classification of the target language documents (220) based on the associated target language embeddings (234).

The target language classifier model (260) may be a binary classifier or a multi-class classifier with any number of classes. In one or more embodiments of the disclosure, the target language classifier model (260) is a deep learnt model and includes contextual layers (262) and a fully connected layer (264). The contextual layers may include recurrent neural networks (RNN). The RNN may accept, as an input, a sequence of target language embeddings (234) to produce a sequence of vectors representing hidden layer outputs. These hidden layer output vectors may subsequently be processed by the fully connected layer (264) which may implement, for example, a softmax function to obtain class probabilities, allowing an appropriate predicted label (266) to be obtained. The RNN may be a long short term memory (LSTM) recurrent neural network. In one or more embodiments of the disclosure, a bidirectional LSTM (Bi-LSTM) is used.

The predicted labels (266), in accordance with one or more embodiments, are the outputs of the target language classifier model (260) when operating on the target language embeddings (234). The predicted labels (266), thus, represent the classification results for the target language documents (220), produced by the target language classifier model (260).

In one or more embodiments of the disclosure, the target language classifier (260) is functionally similar to the source language classifier (240) in that both classifiers perform similar classification tasks. However, the target language classifier (260) operates on target language embeddings (234) only, whereas the source language classifier (240), in combination with the label embedding network (250), operates on source language embeddings (232) primarily.

While the target language classifier model (260) may be structurally similar to the source language classifier model (240), the training of the target language classifier model (260) is significantly different from the training of the source language classifier model (240). A transfer learning approach in which the training of the target language classifier model (260) benefits from a previously performed training of the source language classifier (240) enables training of the target language classifier model (260) even when only limited training data can be obtained from the target language corpus (218), in accordance with one or more embodiments. The use of the classifier training configuration (200) for obtaining the trained target language classifier model (260) is described below with reference to FIGS. 4-7.

Figure 3:
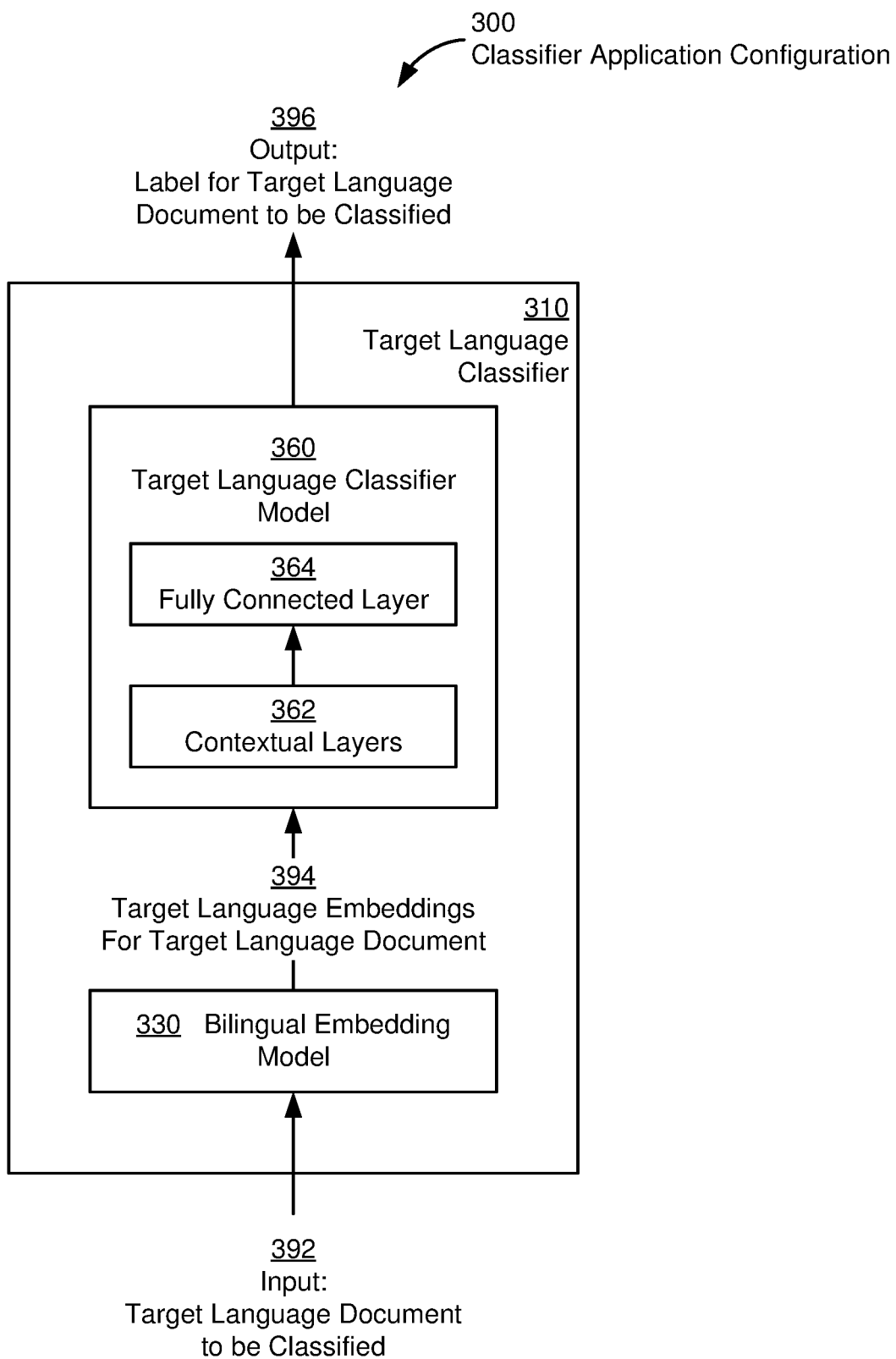
FIG. 3 shows a classifier application configuration, in accordance with one or more embodiments of the disclosure.

Turning to FIG. 3, a classifier application configuration (300), in accordance with one or more embodiments of the disclosure, is shown. The classifier application configuration (300) shows the use of a target language classifier (310) for classifying a target language document (392). The output of the target language classifier (310) is a label (396) for the target language document to be classified. The target language classifier (310) includes a target language classifier model (360) and a bilingual embedding model (330). The target language classifier model (360), in one or more embodiments, corresponds to the target language classifier model (260) in FIG. 2, after the training, as described in FIGS. 4-7, has been completed. The bilingual embedding model (330) may be identical to the bilingual embedding model (230) of FIG. 2. The classifier training configuration (300) may be executed on a computing system such as the computing system of FIGS. 9A and 9B. The use of the classifier application configuration (300) is described below with reference to FIG. 8.

While FIGS. 2 and 3 show configurations of components, other configurations may be used without departing from the scope of the disclosure. For example, various components may be combined to create a single component. As another example, the functionality performed by a single component may be performed by two or more components. The implementation of the neural network models, including the source language classifier model, the target language classifier model, and the label embedding network may be performed using various platforms without departing from the disclosure. For example, the neural network models may be implemented using the PyTorch deep-learning framework enabling rapid prototyping and execution. TensorFlow and MXNet may alternatively be used. The neural network models may be deployed in the cloud, for example, using SageMaker offered by Amazon Web Services (AWS), or in Microsoft Azure Cloud Computing Platform & Services. Alternatively, the model may be deployed using custom solutions such as Intuit Model Execution Service (MXS) built atop of AWS SageMaker.

FIGS. 4, 5, 6, 7, and 8 show flowcharts in accordance with one or more embodiments of the disclosure. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Figure 4:
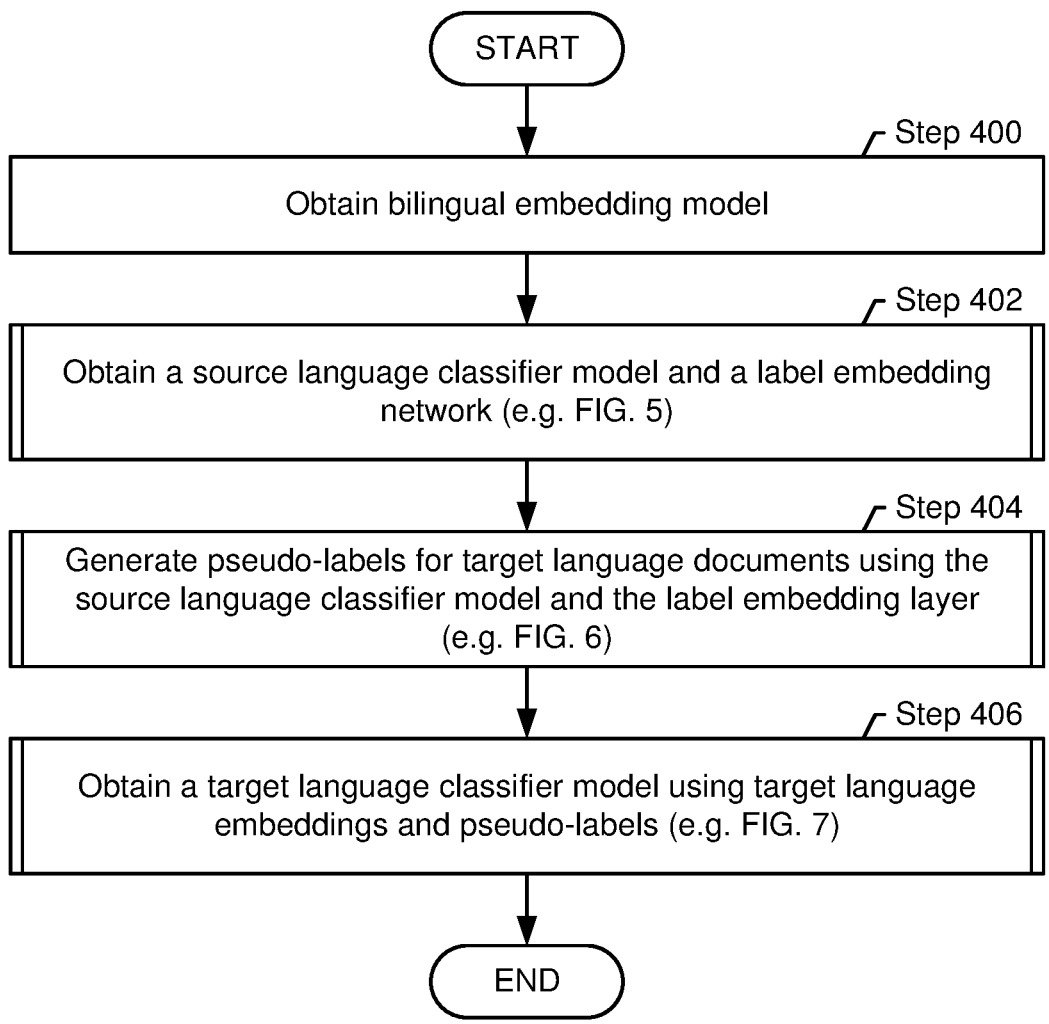
FIG. 4 shows a flowchart describing the obtaining of a target language classifier model using transfer learning, in accordance with one or more embodiments of the disclosure.

Turning to FIG. 4, a flowchart describing a method for obtaining a target language classifier model, in accordance with one or more embodiments of the disclosure, is shown. The target language classifier model is obtained using a transfer learning approach in which a previously trained source language classifier model is used to support the training of the target language classifier. More specifically, the source language classifier may be trained on a source language such as U.S. English text data, and the classification knowledge in the source language classifier model may subsequently be used to train one or more target language classifiers in other languages. The method involves a series of steps that are subsequently described.

In Step 400, a bilingual embedding model is obtained, in accordance with one or more embodiments of the disclosure. The bilingual embedding model is established using a source language corpus and a target language corpus. The resulting bilingual embedding model may represent words found in the source language corpus and in the target language corpus using a high-dimensional joint vector space, in accordance with one or more embodiments of the disclosure. Those skilled in the art will appreciate that a variety of methods for generating bilingual embedding models exist. For example, different methods may be used depending on whether the data in the source language corpus and the target language corpus are word-aligned, sentence-aligned, document-aligned, or topic-aligned. Any one of these and other methods may be used for generating the bilingual embedding model, without departing from the disclosure.

In Step 402, a source language classifier model and a label embedding network are obtained, in accordance with one or more embodiments of the disclosure. A supervised training approach may be taken. More specifically, in one or more embodiments, a set of source language documents and associated source language document labels, taken from the source language corpus, is used for the training of the source language classifier model and the label embedding network. A typically smaller set of target language documents and associated target language document labels, taken from the target language corpus, may next be used to retrain the label embedding network. A detailed description of an example for obtaining the source language classifier model is provided in FIG. 5.

In Step 404, pseudo-labels are generated for the target language documents in the target language text corpus, using the source language classifier model and the label embedding network, in accordance with one or more embodiments of the disclosure. Pseudo-labels are generated to label otherwise unlabeled target language documents. The term "pseudo-label" is used because the labels are generated by the source language classifier (trained using source language data but not target language data) operating on target language embeddings. The target language embeddings may represent target language documents from the target language corpus. A detailed description of an example for obtaining the pseudo-labels is provided in FIG. 6.

In Step 406, a target language classifier model is obtained, in accordance with one or more embodiments of the disclosure. A supervised training approach based on pseudo data may be taken. The pseudo data may include target language embeddings representing target language documents and pseudo-labels generated for these target language documents (rather than actual labels), as described in Step 404. Effectively, the use of the pseudo data establishes training data that might otherwise not be available in the target language. Notably, although the training is performed using supervised learning, the training data used in Step 406 is not provided or verified by a human A detailed description of an example for obtaining the target language classifier is provided in FIG. 7.

After completion of Step 406, the target language classifier is trained and may be ready to perform classifications in the target language, as described below with reference to FIG. 8.

Figure 5:
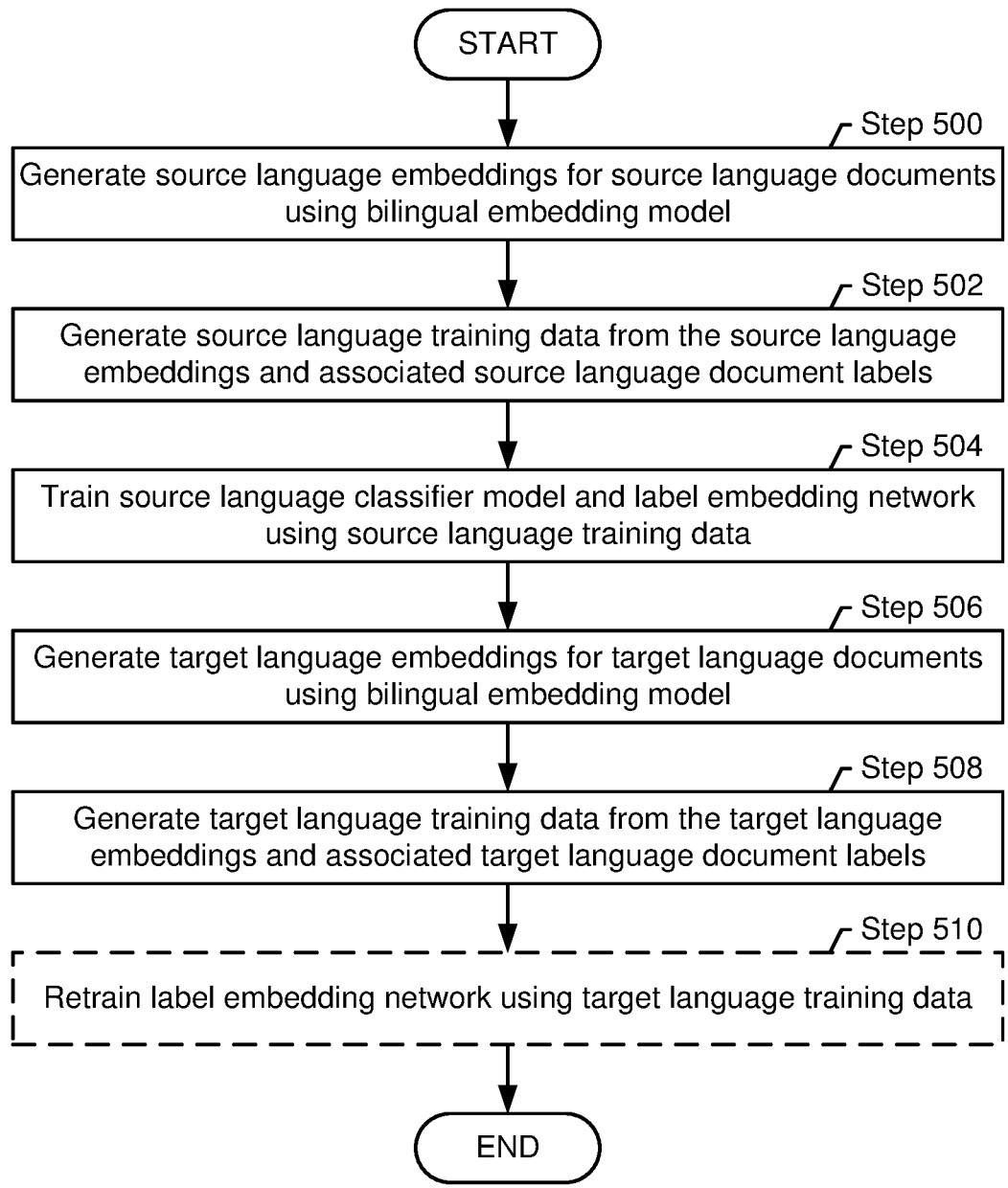
FIG. 5 shows a flowchart describing the obtaining of a source language classifier model and a label embedding network, in accordance with one or more embodiments of the disclosure.

Turning to FIG. 5, a flowchart describing a method for obtaining a source language classifier model and a label embedding network, in accordance with one or more embodiments of the disclosure, is shown.

In Step 500, source language embeddings are generated for source language documents using the bilingual embedding model. The source language documents may be stored in the source language corpus. All or a selection of the source language documents in the source language corpus may be used. For each of the source language documents, a set of source language embeddings is obtained using the bilingual embedding model. A source language embedding may be obtained for each of the words (or any other semantic units) of the source language document. In one embodiment of the disclosure, the source language embeddings are obtained in an ordered manner such that the order of the obtained source language embeddings reflects the order of the words in the source language document. Context may, thus, be maintained. A source language embedding may be obtained from the bilingual embedding model using a lookup operation, assuming, for example, that the bilingual embedding model is stored in a table, matrix, or other structure.

In Step 502, source language training data is generated from the source language embeddings obtained in Step 500 and the associated source language document labels. More specifically, for each of the source language documents being considered when generating the source language training data, a pair consisting of a set of source language embeddings associated with the source language document and the associated source language document label is established. Some of the source language documents may be used to generate validation data. Accordingly, some pairs of source language embeddings and associated source language document labels may be used as validation data.

In Step 504, the source language classifier and the label embedding network are trained using the source language training data. The training may be performed in a supervised manner. Backpropagation may be used by a gradient descent optimization algorithm to adjust the weights of the neurons of the source language classifier and the weights of the label embedding network. The training may include a performance validation using the validation data. The performance validation may be used to assess the predictive capability of the source language classifier and the label embedding network.

In Step 506, target language embeddings are generated for target language documents using the bilingual embedding model. The target language documents may be stored in the target language corpus. All or a selection of the target language documents in the target language corpus may be used. For example, only the target language documents that are labeled may be selected for use in the subsequent steps. For each of the target language documents, a set of target language embeddings is obtained using the bilingual embedding model. A target language embedding may be obtained for each of the words (or any other semantic units) of the target language document. In one embodiment of the disclosure, the target language embeddings are obtained in an ordered manner such that the order of the obtained target language embeddings reflects the order of the words in the target language document. Context may, thus, be maintained. A target language embedding may be obtained from the bilingual embedding model using a lookup operation, assuming, for example, that the bilingual embedding model is stored in a table, matrix, or other structure.

In Step 508, target language training data is generated from the target language embeddings obtained in Step 506 and the associated target language document labels. More specifically, for each of the target language documents being considered when generating the target language training data, a pair consisting of a set of target language embeddings associated with the target language document and the associated target language document label is established. Some of the target language documents may be used to generate validation data. Accordingly, some pairs of target language embeddings and associated target language document labels may be used as validation data. Relatively little target language training data may exist in comparison to source language training data, because only relatively few target language documents may be labeled.

In Step 510, the label embedding network is retrained using the target language training data. The training may be performed in a supervised manner. Backpropagation may be used by a gradient descent optimization algorithm to adjust the weights of the neurons of the label embedding network. The training may include a performance validation using the validation data. Step 510 may be performed when target language training data exists. If no target language training data exists because none of the target language documents include a label, Step 510 may be skipped.

The re-training of the label embedding network using the target language training data may increase the accuracy achieved using the combination of the source language classifier model and the label embedding network when predicting pseudo-labels for target language documents, as further discussed below. Although the execution of Step 510 increases the accuracy, even when Step 510 is skipped, the achieved accuracy may still be good because the label embedding network has already been trained on source language data and, as a result, the label embedding network has acquired knowledge pertaining to grammar, lexicons, and/or semantics which may be globally applicable to the source and the target language. Execution of Step 510, however, enables the label embedding network to acquire target language specific information, in addition, thus further enhancing accuracy.

Figure 6:
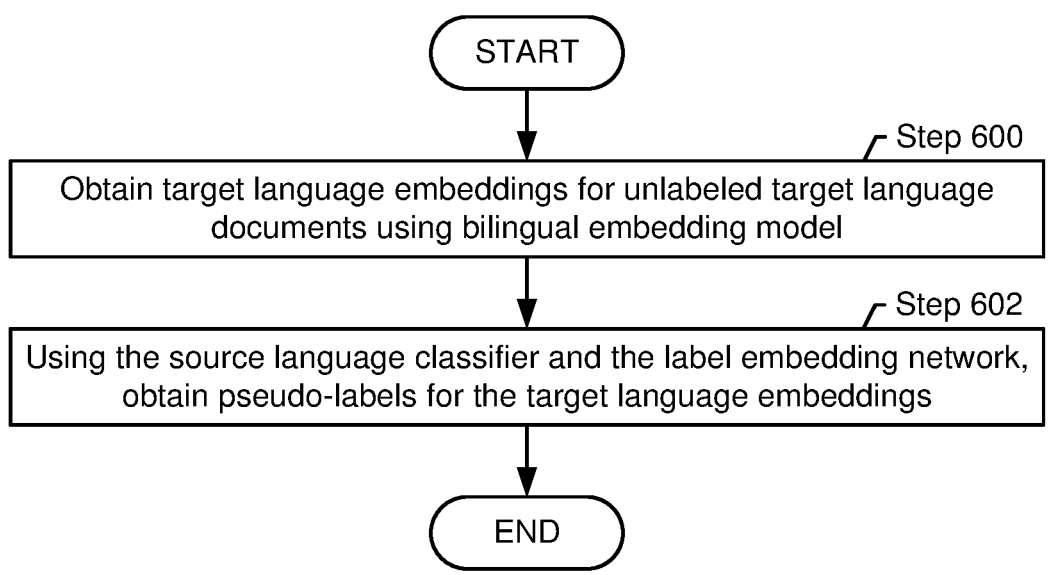
FIG. 6 shows a flowchart describing the obtaining of pseudo-labels for target language documents, in accordance with one or more embodiments of the disclosure.

Turning to FIG. 6, a flowchart describing a method for obtaining pseudo-labels for unlabeled target language documents, in accordance with one or more embodiments of the disclosure, is shown. While the source language classifier model is trained on source language embeddings, in the following steps the source language classifier may be used to predict pseudo-labels for target language embeddings representing unlabeled target language documents. The method of FIG. 6 may, thus, be used to generate training data in the form of the pseudo-labels, paired with the corresponding target language embeddings representing unlabeled target language documents. This training data may later be used to train the target language classifier model, as described below with reference to FIG. 7.

In Step 600, target language embeddings are obtained for unlabeled target language documents. Obtaining the target language embeddings may be performed using the bilingual embedding model. Step 600 may be performed analogous to Step 506 of FIG. 5. However, while in Step 506 only labeled target language documents are considered, in Step 600, unlabeled target language documents are considered.

In Step 602, pseudo-labels are obtained for the target language embeddings. The pseudo-labels are obtained using the source language classifier operating on the target language embeddings. Although the source language classifier was trained to operate on source language embeddings, because a joint embedding space is used for the source language embeddings and the target language embeddings, having the source language classifier operate on the target language embeddings is possible. The label embedding network which was also trained to operate on target language embeddings may ensure that the resulting pseudo-labels have reasonable accuracy.

Figure 7:
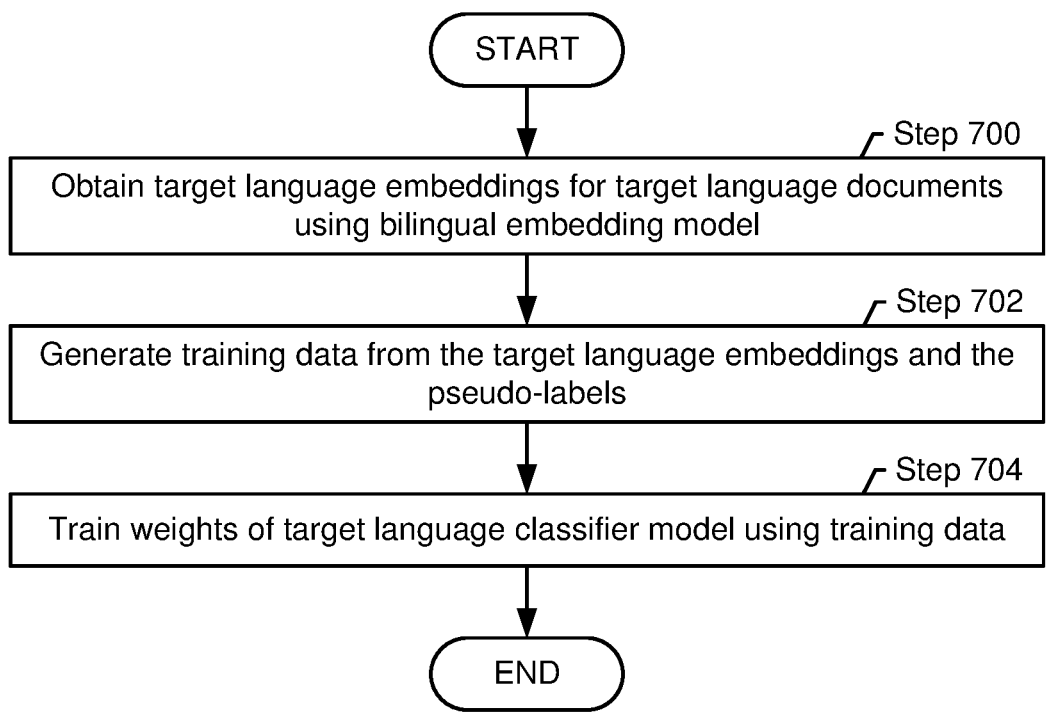
FIG. 7 shows a flowchart describing the training of the target language classifier model, in accordance with one or more embodiments of the disclosure.

After the execution of the method of FIG. 6, annotated data in the form of target language documents annotated with pseudo-labels is available, enabling a subsequent training of the target language classifier model, as described in FIG. 7. Accordingly, even though the initially available labeled target language documents may be insufficient for training the target language classifier model, by labeling initially unlabeled target language documents using the pseudo labels, sufficient training data becomes available to perform the training of the target language classifier model as described in FIG. 7.

Turning to FIG. 7, a flowchart describing a method for training a target language classifier model, in accordance with one or more embodiments of the disclosure, is shown.

In Step 700, target language embeddings are obtained for target language embeddings representing target language documents. Obtaining the target language embeddings may be performed using the bilingual embedding model. Step 700 may be performed analogous to Step 600 of FIG. 6. The target language documents considered in Step 700 may be labeled or unlabeled.

In Step 702, training data is generated from the target language embeddings obtained in Step 700 and the associated labels. An associated label may be a target language document label for a labeled target language document. An associated label may be a pseudo-label, obtained as described in FIG. 6, for an unlabeled target language document. Accordingly, the training data may consist of pairs consisting of a set of target language embeddings and a target language document label or a set of target language embeddings and a pseudo-label. In one or more embodiments, training data consisting of target language embeddings and target language document labels only (but no target language embeddings and pseudo-labels) would not be sufficient for the training. Some of the target language documents may be used to generate validation data. Accordingly, pairs of target language embeddings and associated target language document labels and/or pairs of target language embeddings and associated pseudo-labels may be used as validation data.

In Step 704, the target language classifier model is trained using the training data. The training may be performed in a supervised manner. Backpropagation may be used by a gradient descent optimization algorithm to adjust the weights of the neurons of the target language classifier model. The training may include a performance validation using the validation data. While the training of the target language classifier model is conducted in a supervised manner, the training data, at least partially, consists of data samples that were generated by the source language classifier model (pseudo-labels). Knowledge about the classification task, learned by the source language classifier model during the training in the source language, thus, becomes available to the target language classifier model during the training of the target language classifier model. While the training of the target language classifier model is performed in a supervised manner, the method may be termed "semi-supervised" because pseudo-labels rather than target language document labels are used primarily.

Figure 8:
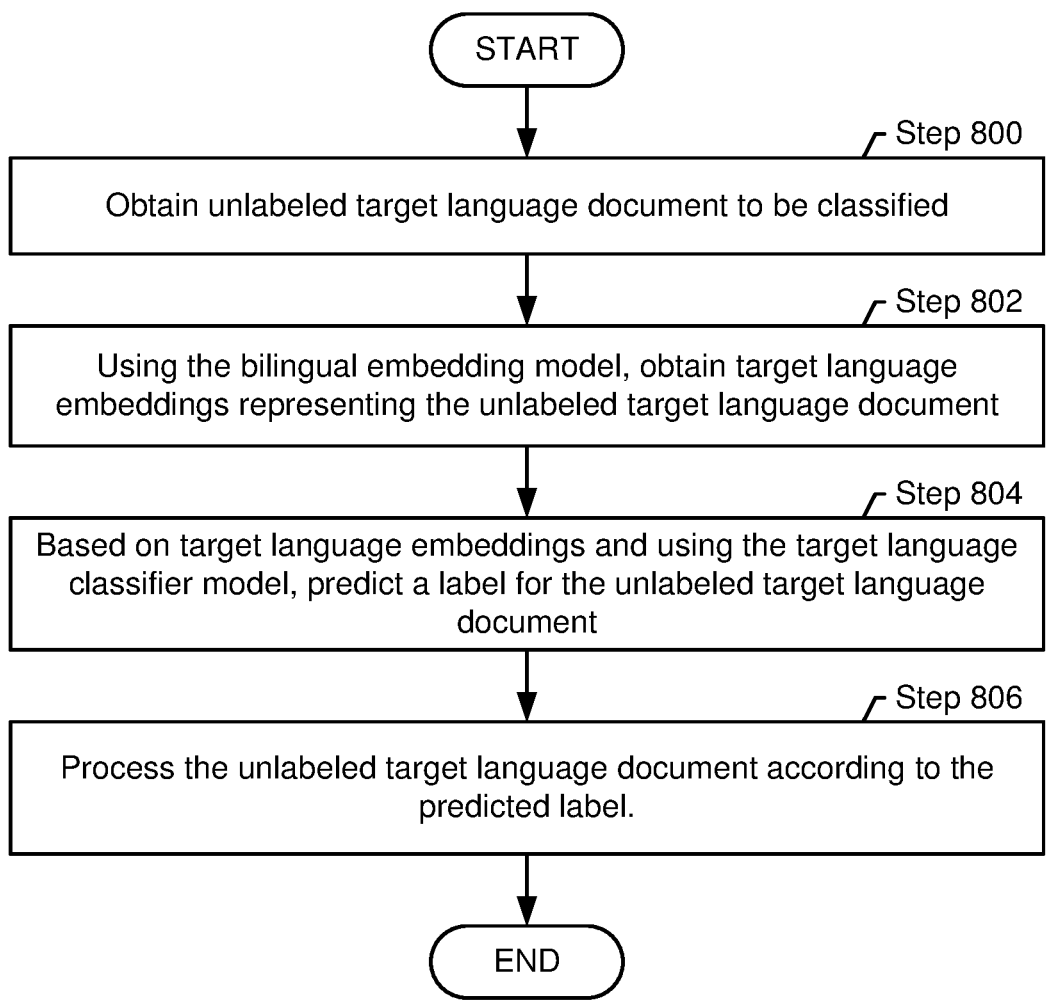
FIG. 8 shows a flowchart describing the application of the trained target language classifier model, in accordance with one or more embodiments of the disclosure.

Turning to FIG. 8, a flowchart describing a method for applying the trained target language classifier model to perform classifications in the target language, in accordance with one or more embodiments of the disclosure, is shown. The method uses the target language classifier model obtained as described in FIGS. 4-7.

In Step 800, an unlabeled target language document to be classified is obtained. The target language document may be obtained in various ways, depending on the nature of the target language document. For example, if the target language document is a spoken or typed user query, the target language document may be obtained from a user input interface. Alternatively, if the target language document is a multi-page document, it may be loaded from a repository. Any method may be used to obtain the target language document from any source. Further, the obtaining of the target language document may include a processing of the target language document. For example, if the target language document is originally provided as a spoken user query, a speech-to-text conversion may be performed.

In Step 802, target language embeddings are obtained for the unlabeled target language document. The target language embeddings may be obtained using the bilingual embedding model as previously described. However, unlike in the previously described training phase in which multiple sets of target language embeddings for multiple text documents (source language documents or target language documents) are obtained, in Step 802 a single set of target language embeddings representing the unlabeled target language document is obtained.

In Step 804, a label is predicted for the unlabeled target language document, based on the target language embeddings obtained in Step 802. The label is predicted by applying the target language classifier model, trained as described in FIGS. 4-7, to the target language embeddings. In other words, the target language embeddings, when fed into the target language classifier model, result in the prediction of the label, as a result of the target language classifier model operating on the target language embeddings.

In Step 806, The unlabeled target language document is processed according to the predicted label. The processing may depend on the application of the target language classifier model and is not intended to limit the scope of the disclosure. For example, in a scenario that relies on the target language classifier model to identify a proper user support group among multiple user support groups, based on a support request submitted as the target language document, the processing may involve forwarding the support request to the proper user support group, as predicted by the label.

Embodiments of the disclosure may be used in various scenarios. Embodiments of the disclosure may be particularly beneficial when, for the same classification task, a vast amount of training data is available in a source language, whereas significantly less training data is available in one or more target languages. Embodiments of the disclosure are equally applicable to binary classification tasks and multi-class classification tasks. An example for a binary classification is the evaluation of sentiment, e.g., based on user-submitted comments, chat protocols, etc. An example for a multi-class classification is the routing of requests to appropriate agents that are best able to respond to the requests. For example, a first request may be routed to an output provided by a software service, whereas a second request may be routed to a bug discovered in the same software service, and a third request may be routed to purchasing an upgrade to a newer version of the same software service. Each of those requests may need to be routed differently (e.g., to a customer support agent, a technical support agent, and a sales agent, respectively). The classifications may be employed to support taxonomies, ontologies, probabilistic topic models, tags, etc.

Classification requirements may be similar for different languages. Accordingly, being able to apply the classification capabilities of a source language classifier to train a target language classifier may be highly beneficial, in particular when support for multiple target languages is desired. Directly training target language classifier models using training data in the target languages may be suboptimal for various reasons. Specifically, for example, it may be difficult to obtain the necessary quantity of training data in the target languages that would meet predefined quality standards, which may use participation of domain experts. Further, significant human supervision may be necessary to obtain a classification performance for the target languages if the target language classifiers are independently and directly trained. In contrast, the described transfer learning-based approach, in accordance with one or more embodiments of the disclosure, may result in the training of target language classifier models that provide acceptable performance and require a minimum of human involvement, during the training process. Embodiments of the disclosure may, thus, enable support for many target languages, even for target languages with relatively few users, which would otherwise be cost-prohibitive.

Figure 9A:
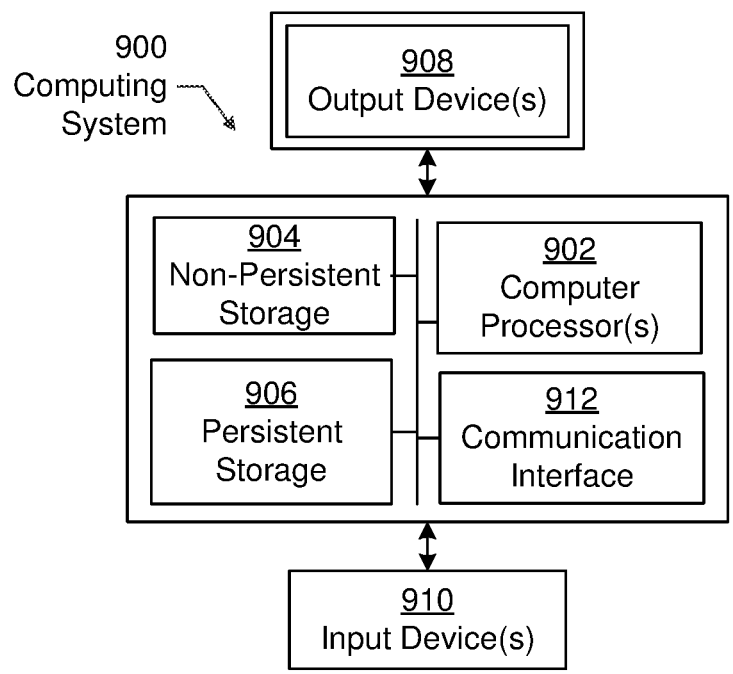
FIGS. 9A and 9B show computing systems, in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 9B:
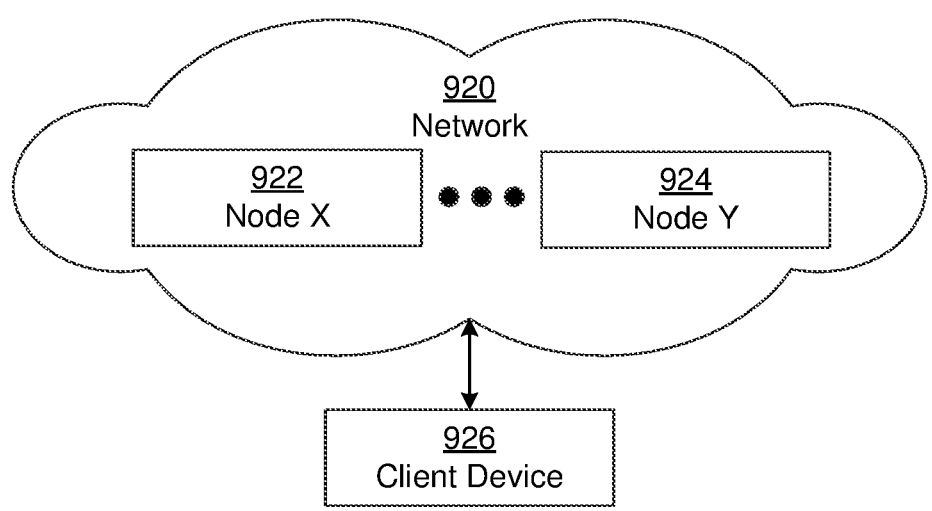

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the disclosure.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 9A and the nodes and/or client device in FIG. 9B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for text classification, the method comprising:
generating, using a bilingual embedding model, a plurality of source language embeddings for source language documents;
obtaining a plurality of source language document labels of the source language documents;
training a source language classifier model and a label embedding network using the plurality of source language embeddings and the plurality of source language document labels;
generating a plurality of pseudo-labels for a plurality of unlabeled target language documents, by:
generating, using the bilingual embedding model, a first plurality of target language embeddings for the plurality of unlabeled target language documents, and
applying the source language classifier model and the label embedding network to the first plurality of target language embeddings to obtain the plurality of pseudo-labels for the unlabeled target language documents; and
training a target language classifier model using the plurality of target language embeddings and the plurality of pseudo labels.

2. The method of claim 1, further comprising:
obtaining, after training the target language classifier model, an unlabeled target language document to be classified;
obtaining, using the bilingual embedding model, a second plurality of target language embeddings for the unlabeled target language document to be classified;
predicting a label for the unlabeled target language document using the target language classifier model operating on the second plurality of target language embeddings; and
processing, according to the label, the unlabeled target language document.

3. The method of claim 1, further comprising:
obtaining a plurality of labeled target language documents and associated target language document labels;
obtaining, using the bilingual embedding model, a second plurality of target language embeddings for the plurality of labeled target language documents;
retraining the label embedding network using the second plurality of target language embeddings and the plurality of target language document labels, prior to obtaining the plurality of pseudo-labels.

4. The method of claim 1, wherein the label embedding network establishes a common vector space in which classifications of the source language documents and the unlabeled target language documents are similarly represented in the common vector space.

5. The method of claim 1, wherein the source language classifier model comprises contextual layers and a fully connected layer.

6. The method of claim 5, wherein the contextual layers comprise a recurrent neural network.

7. The method of claim 1, wherein a subset of the plurality of source language embeddings associated with at least one of the source language documents maintains an order of words of the at least one source language document.

8. The method of claim 1, wherein the bilingual embedding model establishes a joint embedding space for the plurality of source language embeddings and the first plurality of target language embeddings.

9. A system for text classification, the system comprising:
a computer processor; and
a classifier training configuration executing on the computer processor, and configured to:
generate, using a bilingual embedding model, a plurality of source language embeddings for source language documents;
obtain a plurality of source language document labels of the source language documents;
train a source language classifier model and a label embedding network, executing on a computing system, using the plurality of source language embeddings and the plurality of source language document labels;
generate a plurality of pseudo-labels for a plurality of unlabeled target language documents, by:
generating, using the bilingual embedding model, a first plurality of target language embeddings for the plurality of unlabeled target language documents, and
applying the source language classifier model and the label embedding network to the first plurality of target language embeddings to obtain the plurality of pseudo-labels for the unlabeled target language documents; and
train a target language classifier model executing on the computing system using the plurality of target language embeddings and the plurality of pseudo labels.

10. The system of claim 9, wherein the classifier training configuration is further configured to:
obtain, after training the target language classifier model, an unlabeled target language document to be classified;
obtain, using the bilingual embedding model, a second plurality of target language embeddings for the unlabeled target language document to be classified;
predict a label for the unlabeled target language document using the target language classifier model operating on the second plurality of target language embeddings; and
process, according to the label, the unlabeled target language document.

11. The system of claim 9, further comprising:
a classifier application configuration executing on the computer processor, and configured to:
obtain a plurality of labeled target language documents and associated target language document labels;
obtain, using the bilingual embedding model, a second plurality of target language embeddings for the plurality of labeled target language documents;
retrain the label embedding network using the second plurality of target language embeddings and the plurality of target language document labels, prior to obtaining the plurality of pseudo-labels.

12. The system of claim 9, wherein the label embedding network establishes a common vector space in which classifications of the source language documents and the unlabeled target language documents are mathematically similarly represented by a threshold degree.

13. The system of claim 9, wherein a subset of the plurality of source language embeddings associated with at least one of the source language documents maintains an order of words of the at least one source language document.

14. The system of claim 9, wherein the bilingual embedding model establishes a joint embedding space for the plurality of source language embeddings and the first plurality of target language embeddings.

15. A non-transitory computer readable medium comprising computer readable program code for causing a computer system to:
generate, using a bilingual embedding model, a plurality of source language embeddings for source language documents;
obtain a plurality of source language document labels of the source language documents;
train a source language classifier model and a label embedding network, executing on a computing system, using the plurality of source language embeddings and the plurality of source language document labels;
generate a plurality of pseudo-labels for a plurality of unlabeled target language documents, by:
generating, using the bilingual embedding model, a first plurality of target language embeddings for the plurality of unlabeled target language documents, and
applying the source language classifier model and the label embedding network to the first plurality of target language embeddings to obtain the plurality of pseudo-labels for the unlabeled target language documents; and
train a target language classifier model executing on the computing system using the plurality of target language embeddings and the plurality of pseudo labels.

16. The non-transitory computer readable medium of claim 15, wherein the computer readable program code further causes the computer system to:
obtain, after training the target language classifier model, an unlabeled target language document to be classified;
obtain, using the bilingual embedding model, a second plurality of target language embeddings for the unlabeled target language document to be classified;
predict a label for the unlabeled target language document using the target language classifier model operating on the second plurality of target language embeddings; and
process, according to the label, the unlabeled target language document.

17. The non-transitory computer readable medium of claim 15, wherein the computer readable program code further causes the computer system to:
obtain a plurality of labeled target language documents and associated target language document labels;
obtain, using the bilingual embedding model, a second plurality of target language embeddings for the plurality of labeled target language documents;
retraining the label embedding network using the second plurality of target language embeddings and the plurality of target language document labels, prior to obtaining the plurality of pseudo-labels.

18. The non-transitory computer readable medium of claim 15, wherein the label embedding network establishes a common vector space in which classifications of the source language documents and the unlabeled target language documents are mathematically similarly represented by a threshold degree.

19. The non-transitory computer readable medium of claim 15, wherein a subset of the plurality of source language embeddings associated with at least one of the source language documents maintains an order of words of the at least one source language document.

20. The non-transitory computer readable medium of claim 15, wherein the bilingual embedding model establishes a joint embedding space for the plurality of source language embeddings and the first plurality of target language embeddings.

* * * * *